July 17, 1951 J. VANHEERSWYNGHELS 2,561,298

IMPULSE TRANSMITTER FOR AUTOMATIC TELEPHONE SYSTEMS

Filed Jan. 30, 1948 3 Sheets-Sheet 1

INVENTOR
JOSEPH VANHEERSWYNGHELS
BY Toulmin & Toulmin
ATTORNEYS

IMPULSE TRANSMITTER FOR AUTOMATIC TELEPHONE SYSTEMS

Filed Jan. 30, 1948 3 Sheets-Sheet 2

INVENTOR
JOSEPH VANHEERSWYNGHELS
BY Toulmin & Toulmin
ATTORNEYS

July 17, 1951 J. VANHEERSWYNGHELS 2,561,298

IMPULSE TRANSMITTER FOR AUTOMATIC TELEPHONE SYSTEMS

Filed Jan. 30, 1948 3 Sheets-Sheet 3

INVENTOR
JOSEPH VANHEERSWYNGHELS
BY Toulmin & Toulmin
ATTORNEYS

Patented July 17, 1951 2,561,298

UNITED STATES PATENT OFFICE 2,561,298

IMPULSE TRANSMITTER FOR AUTOMATIC TELEPHONE SYSTEMS

Joseph Vanheerswynghels, Brussels, Belgium

Application January 30, 1948, Serial No. 5,221

11 Claims. (Cl. 179—90)

The present invention concerns improvements in and relating to impulse transmitters for telephone sets which are connected to an automatic central station and in which the exchange number to be selected can be made up in a visible manner and then can be transmitted by an automatic device. The arrangement is such that this transmission can be repeated as long as the exchange number to be formed has not been cancelled by the actuation of the special mechanism provided for this purpose.

More specifically, the invention concerns devices of this type, in which an impulse generator produces a determined number or train of impulses during the transmission time for each numeral making up the exchange number. In this type of devices, correcting means are provided which are controlled by the mechanism for making up the exchange number and which can neutralize in each train a number of impulses, depending on the respective numeral of the exchange number, so that for each number selected only such a number of impulses is transmitted to the central station which is characteristic for the respective number.

It is possible to provide that for each character or numeral of the exchange number formed, a definite circuit cancels out or neutralizes a corresponding number of impulses of the train of impulses produced by the generator, but such a system is complicated, cumbersome and burdensome. According to the present invention a relatively small number of corrector circuits is utilized, while the device for making up the exchange number allows to combine these corrector circuits in such a manner that one or more of these circuits can neutralize the desired number of impulses in one and the same impulse train. The total number of corrector circuits is therefore lower than the number of individual different characters or numerals which can be transmitted. The invention furthermore provides that one determined impulse is never neutralized during the transmission of a character or numeral, so that the maximum number of impulses which can be neutralized by the combined action of the corrector circuits is reduced by one.

It is an object of this invention to provide an impulse transmitter for an automatic telephone system in which the number of corrector circuits is reduced to a minimum.

A further object of the invention consists in the provision of an impulse transmitter of the type set forth in the preceding paragraph, in which the number of corrector circuits is reduced either to half the number of the various characters or numerals which can be transmitted, or to half the number which immediately follows the number of numerals or characters, when the last mentioned number is uneven.

Another object of the invention is to reduce to not more than two the number of corrector circuits which intervene in the transmission of any of the numerals or characters which can be transmitted. To this effect, the invention provides that in a device designed to transmit characters or numerals of the series 1 to N in which the generator produces trains with N impulses, a central impulse, i. e. an impulse the order of which is closest to $$\frac{N+1}{2}$$

is never neutralized. On the other hand, a corrector circuit is provided which can neutralize the total of the greatest number of impulses released in one and the same direction with regard to the above mentioned central impulse, while other corrector circuits can respectively neutralize the extreme impulse, the two extreme impulses and etc., up to all the impulses released in the other direction with regard to the said central impulse. In this way it is possible to neutralize the desired number of impulses for the transmission of all characters or numerals by causing a maximum of two corrector circuits to intervene in each transmission of one numeral or character.

A still further object of the invention consists in a simplification of the control system for the corrector circuits. The devices of the type specified comprise as many number elements or selectors as the exchange number to be transmitted can comprise numbers or characters. Each number element consists of a slidable or rotatable element adapted to be moved into various positions corresponding to the numerals 1 to N. Each number element or selector is provided with elements adapted to cooperate with the control system for the corrector circuits in such a manner as to be able to actuate one or more corrector circuits, depending on the number selected by the number element or selector involved. According to one embodiment of the invention which has proved highly advantageous, the control system comprises a movable element which carries the total of the control interruptors of the various corrector circuits. This element is moved during the transmission of an exchange number in such a manner that it cooperates successively with each of the selectors or number elements corresponding to the various numerals making up the exchange number.

These and other objects and advantages of the invention will appear more clearly from the following description in connection with the accompanying drawings which illustrate an embodiment of the invention by way of example, and in which.

Figure 1:
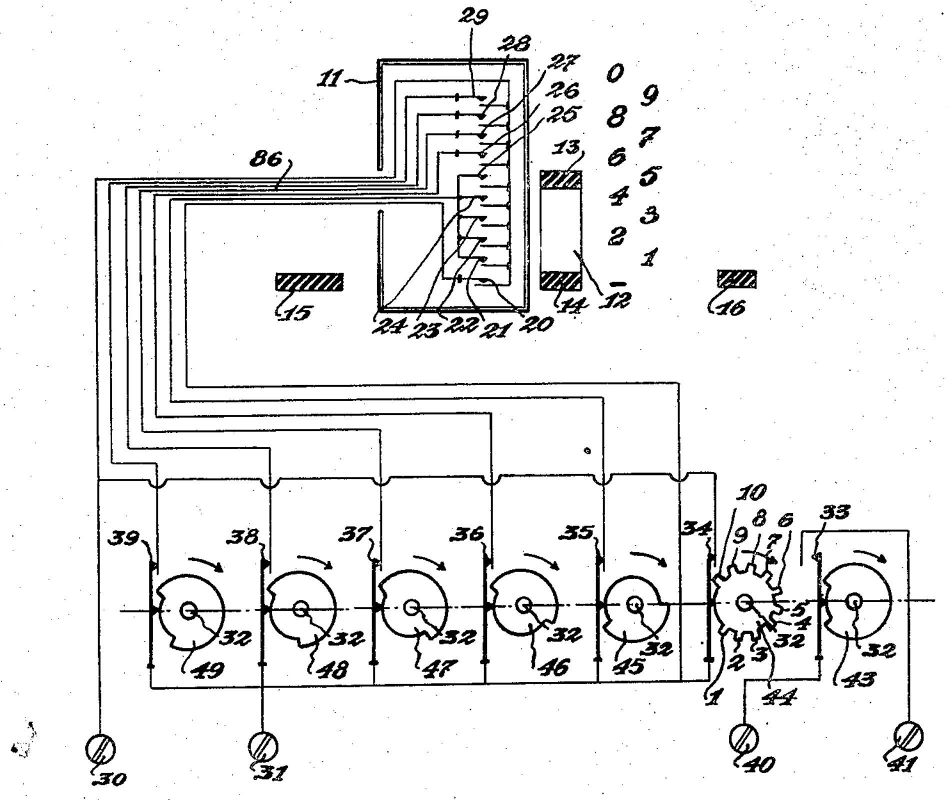
Figure 1 illustrates diagrammatically the principle of the device according to the invention.

Referring now to the drawings, the device illustrated therein represents an impulse transmitter for the transmission of exchange numbers which may be made up of a certain number of characters or numerals selected from the series 1, 2 . . . 9, 0. In other words, in this instance the value selected for N is 10, but it is, of course, understood that the invention is not limited to this particular range, but may also be used for other values of N or each of the numerals 1 . . . 0, or replaced by other signs as for example characters of the alphabet.

Figure 2:
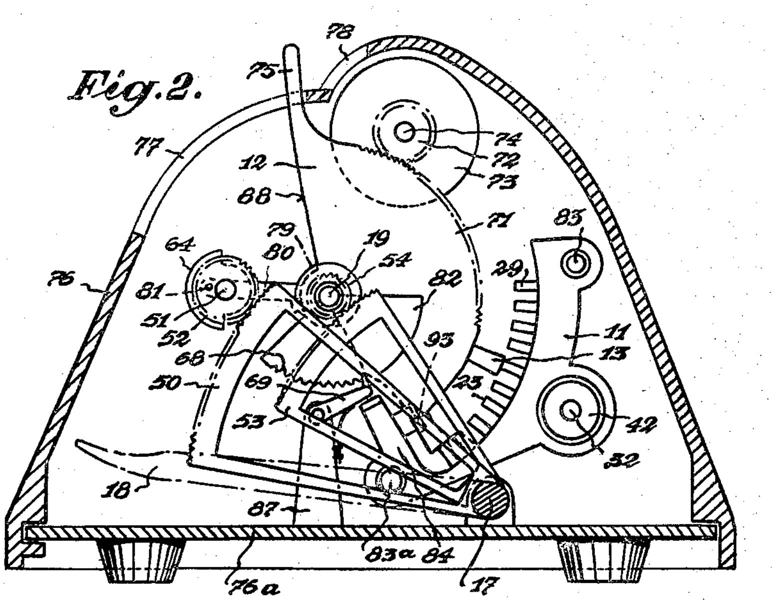
Figure 2 is a lateral view partly in section of a device according to the invention, all elements not essential for the understanding of the invention being omitted from this figure in order to present a clearer view of the essential elements.
Figure 3:
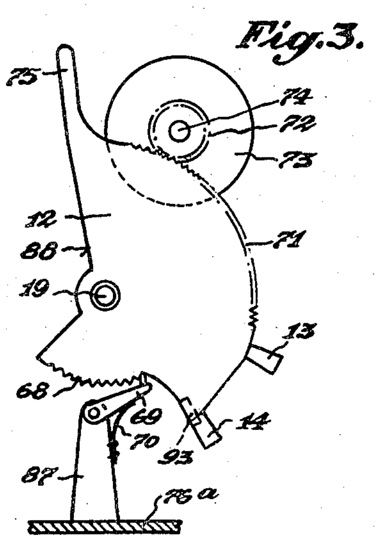
Figures 3 and 4 illustrate details of the device according to the invention.

Referring now to Figure 2 in particular, the structure shown therein comprises a casing 76 for the apparatus, which casing comprises a bottom plate 76*a*. This plate 76*a* supports a shaft 19 having freely rotatably mounted thereon as many number elements or selectors 12 as the exchange number to be transmitted may comprise numerals or characters, for example six or eight. Each number element or selector is actuated by an index 75 extending through a window 77 in the casing 76. The number element or selector has the form of a segment provided on one part of its periphery with teeth 71, which latter are in permanent mesh with a pinion 72. This pinion 72 is mounted on a shaft 74 supported by the bottom plate 76*a*. The pinion 72 is furthermore connected to a cylinder 73 which carries a series of numerals, in this instance 1 . . . 0. The cylinder 73 is rotatable relative to a window 78 provided in the casing 76 in such a manner that there will appear in the window one numeral corresponding to a predetermined position of the number element or selector 12. The number element or selector 12 is provided with a second gear segment 68 which has as many notches as there are positions which the number element or selector can occupy. The segment 68 cooperates with a stop-pawl 69 pivotally mounted in a support 87 which is connected to the bottom plate 76*a*. The pawl 69 is continuously urged by a spring 70 to engage the gear segment 68. The number element or selector 12 furthermore comprises two contact blocks 13 and 14, the purpose of which will be described later.

A shaft 42 the periphery of which is provided with a screw thread of high pitch, is rotatably mounted in bearings supported by the bottom plate 76*a*. A slide 11 provided with a correspondingly threaded bore is mounted on the shaft or spindle 42, and is provided with two openings through which extend two guiding rods 83 and 83*a* supported by the bottom plate 76*a*. The slide 11 is adapted to slide on and be guided by the guiding rods 83 and 83*a*. The slide 11 carries ten interruptors or contacts 20 to 29, each of which is provided with a flexible contact element normally open. The slide 11 is also provided with a movable abutment 85 and a finger 84, the outer free end of which is preferably surrounded with play by a flexible blade connected to the front and rear faces of the said finger. A shaft 32 is mounted in axial alignment with the shaft 42 and is connected to the latter by a free wheel mechanism 94 so that the shaft 32 is rotated only when the shaft 42 rotates in a definite direction. Preferably, a governor (as shown at 95) is adapted to brake the rotation of the shaft 32. Keyed to the shaft 32 are cams 43 to 49 which control the contacts 33 to 39, respectively. The cam 44 constitutes the impulse wheel and is provided with ten teeth 1 to 10. The other cams have a circular protruding part along a more or less large portion of the periphery. These various elements belong to an electric system of the device and their function will be explained further below.

Figure 8:
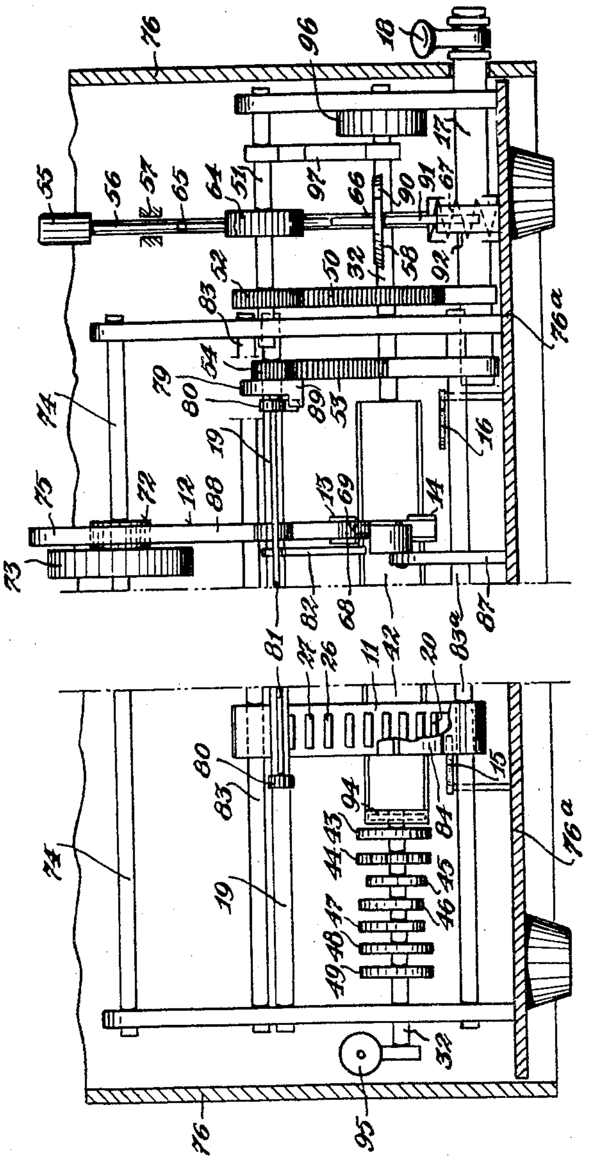
Figure 8 is a diagrammatic partial front view of the apparatus according to Fig. 2, partly in section, several not essential elements being omitted. As in Fig. 2, the apparatus is shown in a position it occupies before the formation of an exchange number and transmission thereof.

The reference characters 30 and 31 designate the terminals of the device according to the invention, while the numerals 40 and 41 designate terminals connected to the telephone receiver (not shown). The bottom plate 76*a* furthermore carries fixed contact blocks 15 and 16 (Figures 1 and 8).

Two gear segments 50 and 53 are keyed to the shaft 17, which latter is rotatably mounted in bearings supported by the bottom plate 76*a*. The shaft 17 extends laterally from the casing 76 and has keyed to the outer end of this extending portion a control lever 18. The segment 50 is in permanent mesh with a pinion 52, the radius of which is $\frac{1}{10}$ of that of the segment 50. The pinion 52 is mounted on a shaft 51, which latter is rotatably mounted in bearings supported by the bottom plate 76*a*. A retraction spring (in a box 96) tends to cause the shaft 51 to rotate in anti-clockwise direction to bring about movement of the lever 18 in clockwise direction, i. e. upwardly from the position shown in the drawing. A gear train or other transmission mechanism, as diagrammatically shown at 97, establishes mechanical connection between the shaft 51 and the screw 42, the arrangement is for instance such that one revolution of the shaft 51 corresponds to ten revolutions of the screw 42. The pitch of the screw 42 is such that one revolution of the screw causes the slide 11 to move axially over a distance equal to the space between two adjacent number elements or selectors 12.

Figure 5:
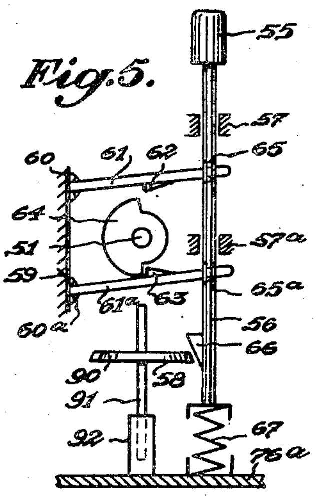
Figure 5 is a diagrammatic view of a device for releasing the transmission of an exchange number formed.
Figure 4:
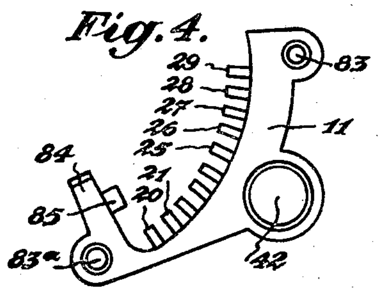
Figure 6:
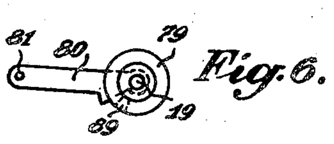
Figures 6 and 7 show further details of the device according to the invention.
Figure 7:
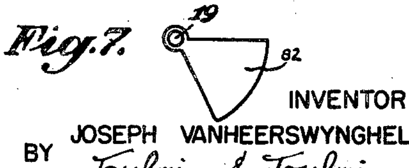

Two levers 80 are connected to a shaft 19 on either side of the number elements or selectors. These levers 80 are interconnected by means of a cancelling or neutralizing rod 81 which is parallel to the shaft 19, and is adapted to act upon the face 88 of the number elements or selectors. The segment 53 meshes with a pinion 54 which is freely rotatably mounted upon the shaft 19 and is connected to a ring 79 (Figures 6 and 8). This ring 79 is provided with an abutment 89 adapted to act upon one of the levers 80 in order to move the rod 81 upwardly, and to return all number elements to their neutral position illustrated in the drawing. This action takes place when the lever 18 is moved by a predetermined angle downwardly from the position illustrated in the drawing, for example into the horizontal position, thereby effecting the cancellation or neutralizing of an exchange number previously formed. During this movement, a cam 82 keyed to the shaft 19 causes the pawl 69 to disengage the teeth of the segment 68. A retraction spring (not illustrated in the drawing) tends to return the levers 80 to the position illustrated in the drawing. Also keyed to the shaft 51 is a cam 64 (Figures 2 and 5) which is provided with two noses acting in opposite directions and cooperating with abutments 62 and 63, respectively, which abutments are provided on the rods 61 and 61*a*. These rods are hinged by means of hinges 60 and 60*a* to a support 59 which is connected to the base plate 76*a*. The other outer ends of the rods 61 and 61*a* slide in bores 65 and 65*a* respectively, provided in a control rod 56, which latter is provided with a control button 55 and extends to the outside of the casing 76. The rod 56 slides in guides 57 and 57*a* which are connected to the base plate 76*a*. The lower end of the rod 56 is under the action of a tension spring 67 which rests upon the base plate 76*a* and tends to push the rod 56 upwardly. The rod 56 carries a movable abutment 66 adapted to recede, which cooperates with a stopping device which allows the lowering of the rods 56 but retains the rods in the lowered position until the device is disengaged by means of a control member which comes into action only when the shaft 51 is rotated in anti-clockwise direction. This device may for instance be provided with a plate 58 having a notch 90 in the periphery thereof, and being supported by a vertical shaft 91, which latter is rotatably mounted in the bearing 92 connected to the base plate 76*a*. A mechanical connection of any desired type may be provided between the shaft 51 and the plate 58 so as to cause rotation of the plate 58 only when the shaft 51 rotates in anti-clockwise direction.

Referring now to Figure 1, this figure illustrates a wiring circuit for the device according to the invention, and in particular shows the various interruptors or contactors of the slide 11, and the connections of the contacts pertaining to the slide 11 with the contacts controlled by the cams 45 to 49. The seven conductors effecting these connections are united in the form of a flexible cable 86. During one revolution, the cam 44 by means of its points 1 to 10 opens the contact 34 ten times. As will be noted from the drawing, the extreme points or contacts of the cam 44 are spaced from each other by a larger distance than the distance between the other contacts or points. In this way, a train of ten impulses is produced which is separated by a relatively large interval from the next train of ten impulses produced during the following revolution of the cam 44. During the transmission of each train of impulses, the cam 43 closes the contact 33 so that the receiver connected to the terminals 40 and 41 is short circuited. The cams 45 to 49 close the corresponding contacts 35 to 39 during the production of impulses 6 to 10, 1 to 4, 1 to 3, 1 to 2, and 1, respectively. The cams are therefore adapted to neutralize these various groups of impulses when the corresponding contacts, i. e. the contacts 21 to 25 controlled by cam 45 and the contacts 26 to 29 controlled by the cams 46 to 49, are closed.

None of these corrective cams therefore neutralizes the fifth impulse. Furthermore, the closure of the contact 20 neutralizes all impulses. The numerals 1 to 0 of the exchange number to be transmitted respectively correspond to the emission of 1 to 10 successive impulses. It is therefore necessary to suppress 9 to 0 impulses following the numeral to be transmitted. This object can be obtained by actuating one or two contacts only, i. e. 21 and 26, 22 and 27, 23 and 28, 24 and 29, 25, 26, 27, 28, 29. The number elements or selectors are so arranged that for each position corresponding to a definite numeral, the blocks 13 and 14 can cooperate with corresponding contacts of the slide 11.

The device operates as follows:

The lever 18, which for example is arranged well to the right of device as shown in Figure 8, is lowered into the position illustrated in dot-dash lines in Figure 2. As a result thereof, the retraction spring acting upon the shaft 51 is loaded and thus can furnish the power to move the various elements of the device in the course of the transmission of an exchange number. Furthermore, the rod 81 has assured the return of all number elements or selectors 12 into the neutral position shown in the drawing, so that no number appears in the window 78. To this effect the lever 18 has been moved from the position shown in the drawing downwardly back and forth, the abutment 89 having actuated the lever 80 during the downward movement of the lever 18. The slide 11 has been moved to the left of the number element or selectors with regard to Figure 8. During the corresponding rotation of the screw 42 the latter has not rotated the shaft 32 due to the connection therewith through the free wheel drive 94. The lever 18 is blocked in the position shown in Figure 2 by means of the cam 64 which occupies the position of Figure 5.

In order to make up the exchange number to be transmitted, as many number elements or selectors are moved starting 2 from the left as there are numerals or characters in the exchange number. The exchange number will then appear in the window 78, each selector being maintained in its angular desired position by means of the pawl 69. At this time it is necessary to have the receiver lifted in order to establish the electric connection with the central station. In order to release or start the movement of the transmission mechanism, the rod 56 is lowered until the yieldable abutment 66 slides behind the plate 58. The shaft 51 then starts to turn in anti-clockwise direction while the shaft 32 and the screw 42 move in the direction indicated by the arrows in Figure 1. The rotation of the screw 42 causes the slide 11 to slide toward the right with regard to Figure 8. At the start no transmission can take place because the contact 20 is closed by the block 15 as long as the slide is at the left of the first number element or selector. After a slight rotation of the shaft 51, particularly when the slide is engaged by the first number element or selector, the notch 90 of the plate 58 releases the abutment 66, and the rod 56 returns to its position illustrated in Figure 5. In the meantime however, the lower nose of the cam 64 has moved beyond the stop area of the abutment 63, so that the shaft 51 can complete a revolution in anti-clockwise direction which suffices for the transmission of an exchange number.

The blocks 13 and 14 of the first number element or selector close the contact or contacts of the slide 11 which corresponds to the number made up by the selector, for example contacts 23 and 28 may be closed for the number 3. The arrangement is such that one train of impulses is formed by the wheel 44 while the slide cooperates with a selector, and while the slide passes from one selector to the following during the dead time between two trains of impulses. The slide also passes from the contact block 15 to the first selector during such a dead time. As long as the slide engages a selector, its elastic finger 84 maintains the corresponding pawl 69 in the gear segment 68 of the respective selector so as to immobilize the same. The slide also operates successively with all selectors which have formed a number and assures the transmission of the exchange number which has been prepared. When the slide has passed beyond the last number element or selector, it cooperates with the fixed block 16 which closes the contact 20 while stopping the formation of impulses. The mechanism will then be at a standstill.

When a number element or selector has not formed a number, i. e. when a selector is not in the position shown in Figure 2, its block 14 occupies a position along the horizontal line indicating the neutral position in Figure 1, while the abutment 85 of the slide 11 engages a recess 93 in the selector, thus blocking the selector and the slide so that it is necessary to lower the lever 18 in order to put the device in action. Furthermore, when the slide is thus stopped by a selector in neutral position, and when the slide has passed beyond all selectors, the cam 43 is stopped in a position at which the contact 33 is open so that the telephone receiver is branch connected to the line and the conversation may now take place.

This arrangement has the advantage that in the case where a number is called having less numerals than there are number elements, the mechanism need not any more effect movements corresponding to the emission of the last figures which are not included in this exchange number. As a result thereof, there will be less wear on the mechanism and less loss of time because the circuit-receiver-line is established immediately when the slide 11 stops.

In order to repeat the exchange number, the push button 55 is pressed down so that when it lowers the lever 18, the abutment 62 stops the cam 64 and the lever 18 when the latter reaches the position illustrated in Figure 2, which fact causes the cancellation of the exchange number. When the lever 18 is released, the transmission will take place in the manner described.

Before effecting the repeating action, it is also possible, if desired, to modify certain numbers of the exchange number.

It is, of course, understood that the invention is by no means limited to the particular structure shown in the drawings, but also comprises any modifications within the scope of the appended claims. For instance, the movement of the slide 11 may be effected in short stops while the slide remains at a standstill during the formation of each impulse train. The number elements or selectors could be actuated by a key board system. Numerous other modifications can be effected with regard to the mechanical electric part of the device without in any way changing the principle of the invention.

What is claimed is:

1. An impulse transmitter for an automatic telephone system which comprises in combination, a plurality of individual characters, manually operable selector means, respectively associated with said characters for selecting any desired character or combination of said characters, electric circuit means, impulse generating means including first switch means, in said circuit means and also including actuating means for said first switch means to produce a train of a predetermined and the same number of impulses for each of said characters, movable means, second switch means carried by said movable means, and associated with said circuit means, actuating means operable to bring about movement of said movable means by said selector means to thereby cause actuation of said second switch means by said selector means in accordance with the selected character or characters, third switch means also associated with said circuit means, control means operatively connected to said impulse generating means and arranged respectively to neutralize one or a plurality of superfluous impulses of an impulse train in accordance with the character or characters desired to be transmitted.

2. An impulse transmitter for an automatic telephone system which comprises in combination, electric circuit means, a plurality of individual characters, manually operable selector means respectively associated with said character for selecting any of said characters or combination of said characters, impulse generating means including switch means, in said circuit means and also including actuating means for said switch means, said impulse generating means being operable to produce a train of a predetermined but the same number of impulses for each character, control means associated with said circuit means and including a plurality of cam means operatively connected to said impulse generating means for respectively neutralizing one or a plurality of impulses of an impulse train in excess of the number of impulses indicative of the respective character, said control means also including movable means adapted to be moved by said selector means and carrying a plurality of contact means respectively operable by said selector means in accordance with the position of said selector means, the arrangement being such that in each position of said selector means not more than two of said contact means being actuated by each selector means, a plurality of contacts arranged in said circuit means and operable by said cam means to thereby, in cooperation with said contact means, control said circuit means, the combined action of said contacts and contact means bringing about neutralization of superfluous impulses depending upon the position of the respective selector means, and means operable to move said contact means and said contacts into position for cooperation during the emission of the train of impulses corresponding to each selector means.

3. An impulse transmitter for automatic telephone systems, which comprises in combination, a plurality of individual characters, manually operable selector means respectively associated with said character for selecting any of said characters or combination of said characters, electric circuit means, interrupter means including an electric switch electrically connected with said circuit means and also including rotatable means operable when rotating alternately to open said last mentioned switch and to allow the same to close, thereby producing a train of the same number of electric impulses during the actuation of said interrupter means irrespective of the selected character or combination of characters, means for rotating said rotatable means, control means including means movably connected to said rotatable means and also including switch means associated with said circuit means, said control means being operatively connected with said selector means and being operable to neutralize impulses not corresponding to selected individual characters, said control means being arranged so as to be adapted to neutralize any one of said impulses except one impulse occurring between the first impulse and the last impulse of said train of impulses.

4. An impulse transmitter for automatic telephone systems, which comprises in combination, a plurality of individual characters, manually operable selector means respectively associated with said characters for selecting any of said characters or combination of said characters, electric circuit means, interrupter means including switch means arranged in said circuit means and also including cam means for actuating said switch means, means operatively connected with said cam means and operable to effect rotation of said cam means to thereby cause the same alternately to bring about opening and closing of said switch means, thus producing a train of the same number of electric impulses for each of said characters during the actuation of said interrupter means irrespective of the selected character or combination of said characters, control means including means movably connected to said cam means and also including switch means associated with said circuit means, said control means being operatively connected with said selector means and being operable to neutralize of each train two groups of impulses separated from each other by at least one impulse dividing said two groups into a larger and a smaller group, the impulses of said larger group being arranged for simultaneous neutralization only, while the impulses of the other group are arranged for selective neutralization of the outermost impulse alone, or the outermost impulse together with the next impulse or any number of next impulses.

5. An impulse transmitter for automatic telephone systems, which comprises in combination a plurality of individual characters, manually operable selector means respectively associated with said characters for selecting any of said characters or combination of said characters, main electric circuit means, interrupter means including switch means in said circuit means and also including rotatable cam means operable to actuate said switch means to thereby produce a train of the same number of electric impulses during the actuation of said interrupter means irrespective of the selected character or combination of characters, actuating means operable to rotate said cam means, neutralizing means associated with said interrupter means for neutralizing impulses not corresponding to selected individual characters, said neutralizing means including a plurality of auxiliary circuit means in parallel arrangement with each other and each comprising a contact operable by said selector means in conformity with the respective position thereof, said auxiliary electric circuit means being electrically connected to said main electric circuit means and being respectively controlled by cams movably connected to said cam means, said cams being arranged relative to each other so that their effective cam surfaces become effective in a predetermined sequence for short circuiting the respective circuit or circuits to neutralize any of said impulses except one impulse occurring between the first impulse and the last impulse of said train of impulses.

6. An impulse transmitter for automatic telephone systems, which comprises in combination a plurality of individual characters, manually operable selector means respectively associated with said characters for selecting any of said characters or combination of said characters, electric circuit means, interrupter means including switch means, in said circuit means and cam means movable to actuate said switch means for producing a train of one and the same number of electrical impulses during the actuation of said interrupter means irrespective of the selected character or combination of characters, means drivingly connected with said cam means and operable to move the same, a slidable member supporting a plurality of control switches electrically connected with said circuit means and adapted to be engaged by said selector means in conformity with the respective position thereof, means operable to actuate said cam means and to bring about movement of said slidable member sequentially opposite each of said selector means, and neutralizing means including cam members movably connected to said cam means and also including additional switch means operable by said cam members and electrically connected to said control switches for neutralizing impulses in excess of the number of impulses characteristic for the selected character, said cam members being arranged relative to each other so that, when turning in unison with said cam means, their cam surfaces become effective in a predetermined sequence for short circuiting the respective circuit or circuits to neutralize any of said impulses except one impulse occurring between the first impulse and the last impulse of said train of impulses.

7. An impulse transmitter for automatic telephone systems, which comprises in combination a plurality of individual characters, manually operable selector means respectively associated with said characters for selecting any desired character or combination of said characters, electric circuit means, impulse generating means including switch means in said circuit means and also including cam means for actuating said switch means so as to bring about alternate opening and closing of said switch means, thereby producing a train of N impulses for each character selected from N different characters and forming a part of the exchange number to be transmitted, means operable for actuating said cam means, said impulse generating means including means for emitting the impulse of the order of the whole number represented by or closest to $$\frac{N+1}{2}$$

and called "central impulse," means operatively connected to said cam means for moving the same, neutralizing means of one and the same impulse train simultaneously to release the total of impulses following said central impulse and also being adapted to release of said same impulse train effectively the first impulse or said first impulse in combination with one or more directly following impulses prior to said central impulse, said neutralizing means including a plurality of parallel circuits electrically connected with said electric circuit means and each including at least a first switch adapted to be actuated by a selector in front thereof and also including a second switch operable by a cam member movably connected to said cam means.

8. An impulse transmitter for an automatic telephone system which comprises in combination, a plurality of individual characters, manually operable selector means respectively associated with said characters for selecting any of said characters or combination thereof, main electric circuit means, an impulse generator including switch means arranged in said circuit means and also including cam means for actuating said switch means so as to bring about alternate opening and closing of said switch means to produce a train of a predetermined but the same number of impulses for each character, actuating means movably connected with said cam means for operating the same, a plurality of auxiliary circuit means electrically connected with said main circuit means and comprising first switch means adapted respectively to be actuated by cam members movably connected to said cam means and also comprising second switch means supported by a movable member and operable by said selector means in response to predetermined positions thereof, means operatively connected with said actuating means for moving said movable member successively by said selector means to thereby cause those selector means which are in operative position to actuate said second switch means, and means connected with said selector means and adapted during the production of successive impulse trains corresponding to the various characters of the exchange number to be transmitted to actuate said switch means and in cooperation with said first switch means controlled by said cam members to neutralize for each of these characters the impulses in excess of the impulses characteristic for the respective character.

9. An impulse transmitter for an automatic telephone system which comprises in combination, a main electric circuit, an impulse generator including a switch in said circuit and a rotatable interrupter cam for actuating said switch to thereby successively produce a train of a predetermined number of impulses for each character making up the exchange number to be transmitted, a plurality of auxiliary circuits connected to said main circuit, each of said auxiliary circuits comprising a first switch carried by a movable member and also comprising a second switch operable by a cam member, each of said cam members being rotatably connected to said interrupter cam to rotate in unison therewith, a plurality of character elements, each of said character elements being movable into as many different positions as there are different values for said character element, manually operable means for moving each character element into position corresponding to the various characters of the exchange number to be transmitted, contact means fixed to each character element and arranged for cooperation with said first switches, means arranged for driving connection with said movable member and said interrupter cam for actuating the latter and moving said movable member successively into position for cooperation with each of said character elements while in operative position to thereby cause the latter to actuate at least one of said first switches by means of the fixed contact means of the corresponding character element, said first switches when actuated by said fixed contact means being operable in cooperation with said second switches controlled by said cam members to neutralize of said impulse train as many impulses as there are in excess of the number of impulses characteristic for the selected character.

10. In an impulse transmitter for an automatic telephone system, the combination of a plurality of selectors corresponding in number to the number of characters which the exchange number to be transmitted may comprise, each of said selectors being movable from an ineffective position into a plurality of effective positions corresponding in number to the number of different characters which the respective selector may select, electric circuit means, an impulse generator arranged to interrupt said circuit means for successfully producing a train of one and the same predetermined number of impulses for each of said selectors, said generator including a switch arranged in said electric circuit means and also including a rotatable cam with as many effective cam sections as there are different characters adapted to be selected, a movable control member carrying a plurality of first control switches for actuation by said selectors, driving means movably connected to said control member and operable to move said control member with its control switches into position for successive cooperation with each of said selectors, means drivingly connected with said driving means and responsive to the movement of said control member into position for cooperation with any one of said selectors for making said impulse generator effective, a plurality of second control switches arranged in parallel circuits containing said first control switches and electrically connected to said electric circuit means, means movably connected with said rotatable cam means and operable to actuate said second control switches for neutralizing as many of said predetermined impulses as there are in excess of those impulses which are assigned as indication for the respective individual character selected by the selector respectively cooperating with said control member, and abutment means respectively connected with said selectors and arranged in the ineffective position of the respective selector to extend into the path of movement of said control member for engaging the latter in a predetermined position to thereby arrest said control member and driving means therefor and also the driving means for said impulse generator drivingly connected with the driving means for said control member.

11. In combination in an impulse transmitter for automatic telephone systems, a plurality of sets of individual characters, a plurality of manually operable selectors respectively associated with said sets for selecting any desired character or combination of characters, main electric circuit means, impulse generating means including switch means in said circuit means and also including a rotatable cam with as many separate effective cam areas as there are different characters adapted to be selected for actuating said switch means to thereby create one and the same number of impulses for each of said selectors, a plurality of auxiliary circuit means electrically connected to said main circuit means and including first control switch means and second control switch means, a plurality of control members respectively associated with said first control switch means and drivingly connected to said cam for actuating said first control switch means, a movable member carrying said second control switch means and arranged for actuation by said selector means, and driving means drivingly interconnecting said movable member, said cam, and said control members.

JOSEPH VANHEERSWYNGHELS.

REFERENCES CITED

The following references are of record in the file of this patent:

UNITED STATES PATENTS

| Number | Name | Date |
|---|---|---|
| 2,072,572 | Vanheerswynghels | Mar. 2, 1937 |
| 2,134,626 | Shipton | Oct. 25, 1938 |
| 2,253,650 | Richard | Aug. 26, 1941 |
| 2,276,954 | Fritts | Mar. 17, 1942 |
| 2,341,305 | Hickman | Apr. 11, 1944 |

FOREIGN PATENTS

| Number | Country | Date |
|---|---|---|
| 491,755 | Great Britain | Sept. 8, 1938 |
| 733,549 | France | Oct. 7, 1932 |